235-381 SR
5/5/81 OR 4,266,121

United States Patent [19] [11] 4,266,121
Hirose [45] May 5, 1981

[54] RECEIPT SLIP ISSUING APPARATUS

[75] Inventor: Minoru Hirose, Yokohama, Japan

[73] Assignee: Tokyo Shibaura Denki Kabushiki Kaisha, Kawasaki, Japan

[21] Appl. No.: 89,634

[22] Filed: Oct. 29, 1979

[30] Foreign Application Priority Data

| | | | |
|---|---|---|---|
| Nov. 10, 1978 | [JP] | Japan | 53-138648 |
| Nov. 17, 1978 | [JP] | Japan | 53-158130[U] |
| Feb. 22, 1979 | [JP] | Japan | 54-22056[U] |

[51] Int. Cl.[3] .......... G06F 7/08; G06K 3/12; G06K 13/00

[52] U.S. Cl. .......... 235/381; 235/432; 235/475

[58] Field of Search .......... 235/375, 379, 380, 381, 235/432, 475; 340/149 A; 101/DIG. 25

[56] References Cited

U.S. PATENT DOCUMENTS

| | | | |
|---|---|---|---|
| 2,792,148 | 5/1957 | Goldenberg | 235/381 |
| 3,445,633 | 5/1969 | Ratner | 235/381 |
| 3,644,713 | 2/1972 | Hayakawa et al. | 235/381 |
| 3,943,335 | 3/1976 | Kinker et al. | 235/381 |
| 4,199,100 | 4/1980 | Wostl et al. | 235/381 |

*Primary Examiner*—Daryl W. Cook
*Attorney, Agent, or Firm*—Cushman, Darby & Cushman

[57] ABSTRACT

Disclosed is a receipt slip issuing apparatus for an automatic transaction system in which an identification card path crosses a blank path through which a two-ply details slip blank is fed, and a transcription mechanism for transferring card-borne information onto the blank is located in the position of such crossing. In a positional state for transcription on the blank, a printing mechanism corresponds to a first line to be printed of the blank, and a cutter is so located as to correspond to a position where a lower sheet of the blank is to be cut for each slip. A receipt slip outlet is disposed right under an I.D. card inlet-outlet, whereby a user may catch and draw out both his I.D. card and an issued receipt slip one-handed.

11 Claims, 8 Drawing Figures

RECEIPT SLIP ISSUING APPARATUS

BACKGROUND OF THE INVENTION

This invention relates to a receipt slip issuing apparatus for issuing receipt slip for the confirmation of transaction to a user or customer who performs his desired transaction, such as for example drawing-out of cash, by inserting an identification medium for transactions, such as an identification card (hereinafter referred to as I.D. card), into the apparatus.

The apparatus of this type may be incorporated into a cash dispensing machine as a mechanical section thereof, or connected as a unit with another apparatus unit having a different function to be used as a terminal for an automatic transaction system.

In a cash dispensing machine containing such receipt slip issuing apparatus, for example, when a user inserts his I.D. card through a card inlet and inputs his desired amount of money by operating a keyboard, cash or paper money corresponding to such amount is delivered, and a receipt slip bearing an account of transaction is issued through a slip outlet. A receipt slip blank, which is formed of continuous elongated 2-ply sheets, is contained in the apparatus. The elongated blank is drawn out successively for each transaction in response to a command signal given by the apparatus, and fed through a blank path. Then, specific account information recorded in the inserted I.D. card is transferred to the blank by a transcription mechanism, and transient account information including transaction details, data, etc. in accordance with the user's input is printed on the blank. One sheet of the blank subjected to such transcription and printing is cut into a predetermined length by a cutter mechanism, and issued as an individual receipt slip from the slip outlet through a slip delivery path.

For prevention of crimes, conventional cash dispensing machines are generally too bulky to carry about, so that a receipt slip issuing apparatus built therein are designed with generous depth, on the whole. Accordingly, in one such conventional apparatus, a blank is fed and cut at a predetermined position by a cutter mechanism. Then, the blank is reversed, and a first line on one receipt slip region of the blank where printing is to be started is brought in alignment with a printing mechanism, where suitable transient account information is printed on the slip region. Thereafter, the blank is moved a little, a position on the slip region for transcription is brought in line with a transcription mechanism for transcription, and then the blank is further fed and cut at a predetermined portion by the cutter mechanism to provide a slip.

As may be understood from the above description, the blank is advanced or reversed through a required distance by a feed drive mechanism with every printing or transcribing operation. Therefore, the blank feed operation is complicated, and the planning and adjustment of operation processes are very difficult. Further, a pulse motor, for example, is used as the feed drive means, requiring extremely high cost of production.

Moreover, in the feed process for the printing and transcribing operations, the blank is intermittently moved relatively slowly, whereas the cut slip should preferably be trasferred through the delivery path as fast as possible. Hereupon, it is necessary that the difference between the speeds of transportation through the blank path and the slip delivery path be compensated at a boundary region between the paths, and that the uncut portion of the blank be subjected to no tensile force. Therefore, according to the prior art apparatus, a free space substantially equivalent to the length of a slip is provided between the cutter mechanism and a slip drawing roller in the slip delivery path, and a single slip cut by the cutter mechanism is drawn into the drawing roller. Thus, the apparatus is made longer by a length for the free space, and the fixed dimensions of the free space would make it impossible to deal with a longer slip by means of the same apparatus.

Furthermore, in the large-sized prior art apparatus, an I.D. card inlet-outlet is disposed at a distance from a slip outlet partly because of the elongated construction of the apparatus, so that the user must receive the card and the slip, as well as cash, separately. Thus, there have been demands for simplification of the user's operations and reduction of the time required therefor.

SUMMARY OF THE INVENTION

Accordingly, the object of this invention is to provide a receipt slip issuing apparatus capable of highly simplified slip blank feeding operation, compact design, reduced cost of production, and very easy user operation.

In order to attain the above object, a receipt slip issuing apparatus according to this invention is so arranged that a slip blank may be fed intermittently only in one direction at a relatively low speed by a blank feed means, that a first line to be printed of the blank may correspond to a printing means when a portion of the blank for transcription is brought in alignment with a transcription means in a blank path during such feed, and that a cutter means may, at the same time, correspond to a to-be-cut portion of one sheet of the blank which is formed of two overlapping sheets. Thus, the apparatus is made compact, and operating time may greatly be reduced due to the simultaneous printing, transcribing and cutting operations.

Moreover, according to this invention, at least the outer peripheral portion of a slip drawing roller in a slip delivery path is formed of sponge rubber material, and a receipt slip is drawn between the outer peripheral surface of the roller and a guide plate which is in aliding contact with the surface. Accordingly, the slip blank will not be subjected to any excessive tensile force, and the difference between the lower blank feed speed and the higher slip delivery speed may be compensated. Further, the sponge roller is located in close vicinity to the cutter means, so that a free space which has conventionally been inevitable can be minimized.

Furthermore, a slip outlet is disposed in close vicinity to or, for example, right under an I.D. card inlet-outlet, and a slip delivery path portion connected directly to the slip outlet is inclined so that the slip to be delivered may rush out diagonally through the outlet from below. Thus, user operation is simplified; a user may catch and receive both the I.D. card and the receipt slip one-handed.

DETAILED DESCRIPTION OF THE PREFERRED EMBODIMENTS

Now there will be described in detail embodiments of this invention with reference to the accompanying drawings.

Figure 1:
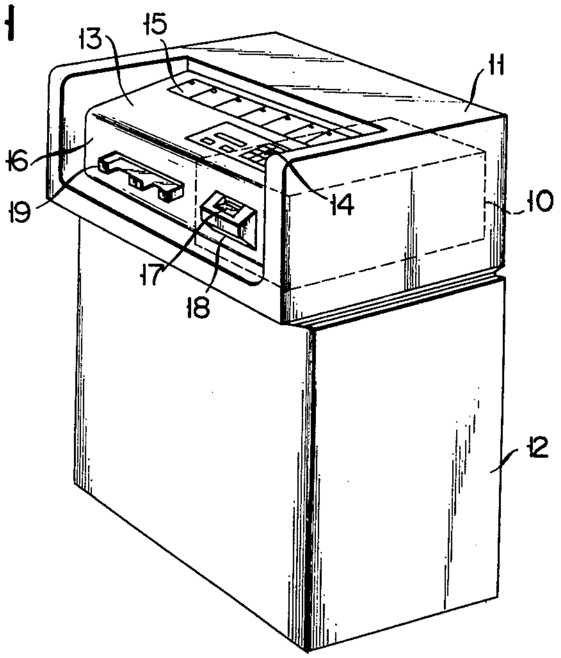
FIG. 1 is an outward perspective view of a cash dispensing machine containing a built-in receipt slip issuing apparatus according to this invention.

Referring now to the drawing of FIG. 1, there is shown a receipt slip issuing apparatus 10 according to this invention which is built in a cash dispensing machine, as indicated by broken line. This machine is greatly reduced in overall size due to the miniaturization of the slip issuing apparatus 10. The dispensing machine is capable of being separated into two consoles-upper and lower. An upper console 11 contains therein mechanical parts including a cash delivery mechanism, as well as the issuing apparatus 10, while the lower console 12 incorposrates an electric power source and electric control devices such as a memory. Connected in common with the lower console 12, a plurality of such upper consoles 11 may, in some cases, be mounted on a service counter in a bank. Further extended may be a modification to use each dispensing machine as a terminal for an automatic transaction system, with the lower console 12 connected to a host computer.

In the upper console 11 of the dispensing machine, an input keyboard 14 and an optical display 15 are disposed on a top control panel 13, while a section including a card inlet or slot 17 through which a identification medium, such as an identification card or I.D. card as it is called, is inserted and a slip outlet 18 right under the card slot 17, and a section including a cash outlet 19 are arranged on a front panel 16.

When a user inserts his I.D. card into the card inlet 17 and inputs his desired amount by means of the keyboard 14, the optical display 15 successively indicates operation commands given from the dispensing machine. Then, the user operates the keyboard in accordance with such commands, and he can receive cash through the cash outlet 19. At the same time, the card is returned and appears again at the card inlet 17, and a receipt slip for the confirmation of transaction is delivered to the slip outlet 18. Then, the user takes out these card and receipt slip, and one-time transaction is completed. This invention is characterized partly in that the card and receipt slip can be taken out one-handed and at a time, as shown in the enlarged view of FIG. 6. The internal construction of this section will be mentioned later.

Figure 2:
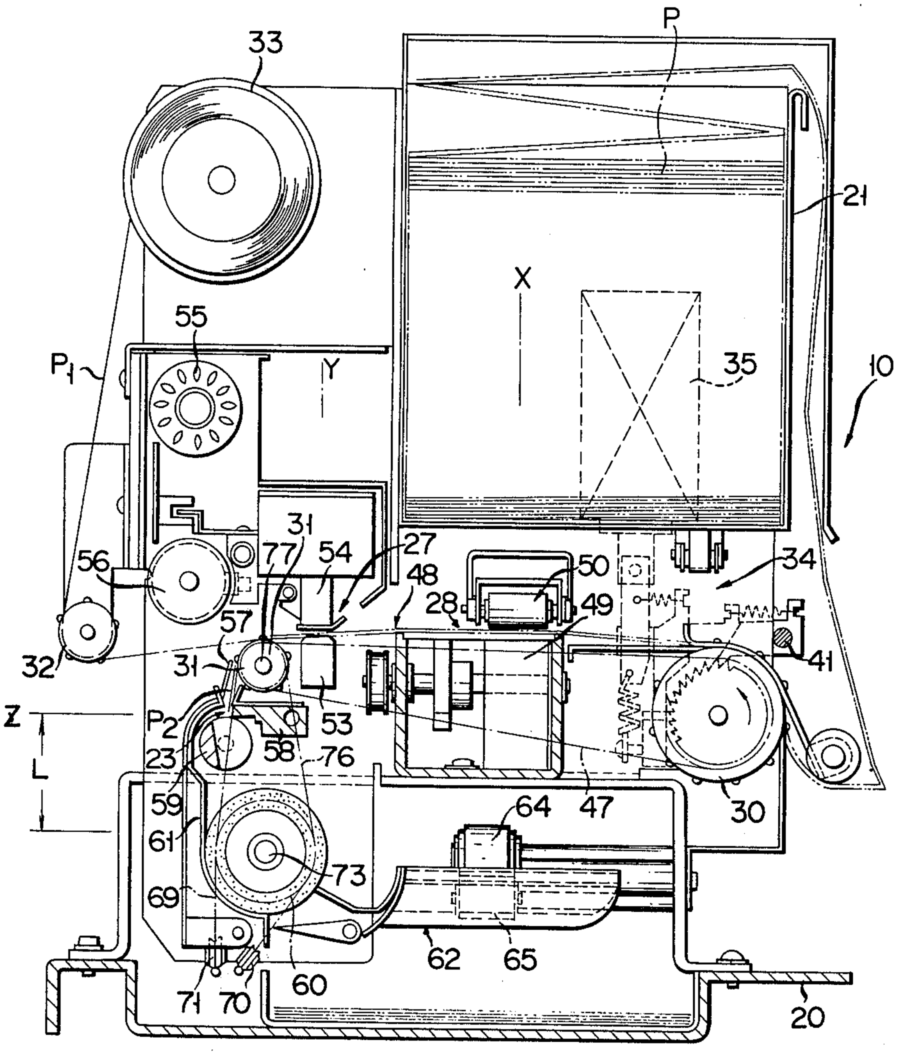
FIG. 2 is an enlarged profile of the receipt slip issuing apparatus built in the dispensing machine of FIG. 1.
Figure 3:
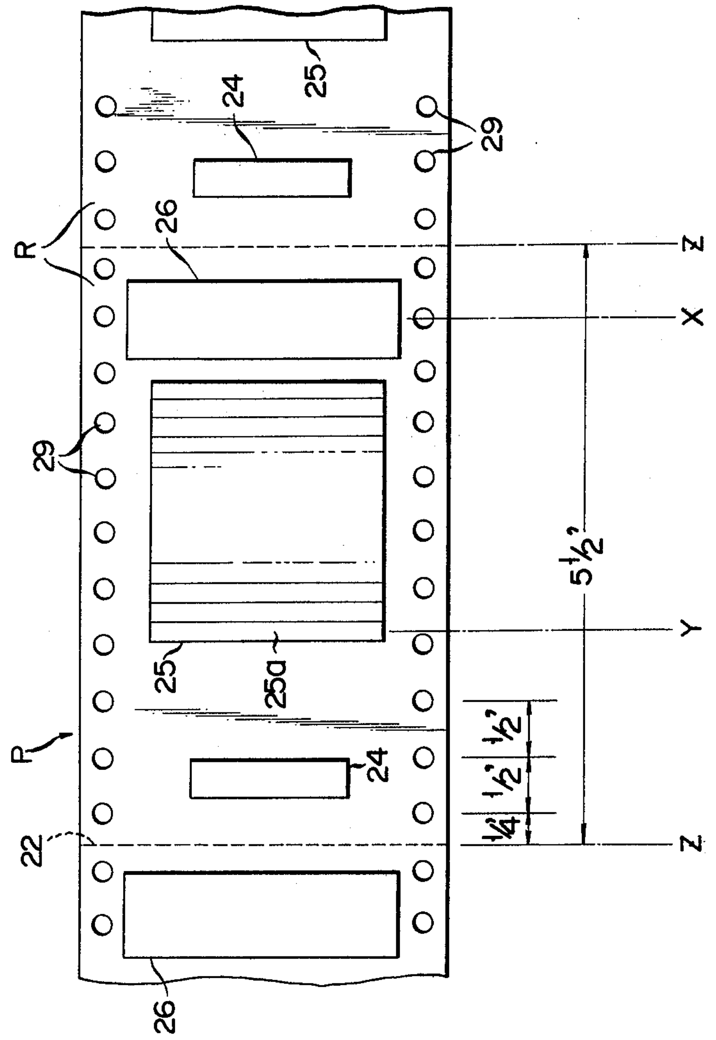
FIG. 3 is an enlarged partial plan of a receipt slip blank.

Referring now to FIG. 2, there is shown a blank storage chamber 21 disposed at an upper portion of a body 20 of the receipt slip issuing apparatus 10 and containing a folded continuous blank or paper P for receipt slips. In the blank P, which is elongated two-ply carbonless duplicating paper, broken lines 22, as shown in FIG. 3, serve both as folds and lines along which the blank is to be cut by means of a cutter mechanism 23 as mentioned later. Each unit or section of blank defined by these broken lines 22 corresponds to a slip R to be issued. The space between each two adjacent broken lines 22 may, for example, be 5½ inches, which will be the length of the slip. The slip bears thereon a print 24 for the name of the issuing bank near its top or head portion, a printing frame 25 at the middle portion, and a transcription frame 26 at the tail end portion. In the printing frame 25, several pieces of transient account information including transaction data, amount of payment, balance, etc. are successively clacked out at regular pitches from the first line to the last. The line pitch may be ½ or ⅓ inch, for example. Specific account information recorded on the I.D. card is transferred to the transcription frame 26 by means of a transcription mechanism 28.

On both sides of the blank P are sprocket holes 29 arranged at ½ inch pitches, for example. The space between the broken line 22 and its adjacent hole 29 is set at ¼ inch, as shown in FIG. 3, for example.

As shown in FIG. 2, the slip blank P is stretched between a supply-side sprocket wheel 30 and a delivery-side sprocket wheel 31, whose diameter is much smaller than that of the wheel 30, and is intermittently conveyed in one direction, that is, to the left. An upper sheet $P_1$ of the blank, not subjected to cutting, is passed through a guide roller 32 and wound round an upper drum 33 for the safe keeping as transaction records of the apparatus. On the other hand, a lower sheet $P_2$ is cut into each individual slip R by the cutting mechanism 23 behind the delivery-side wheel 31, and issued to the user, as mentioned later.

Figure 4:
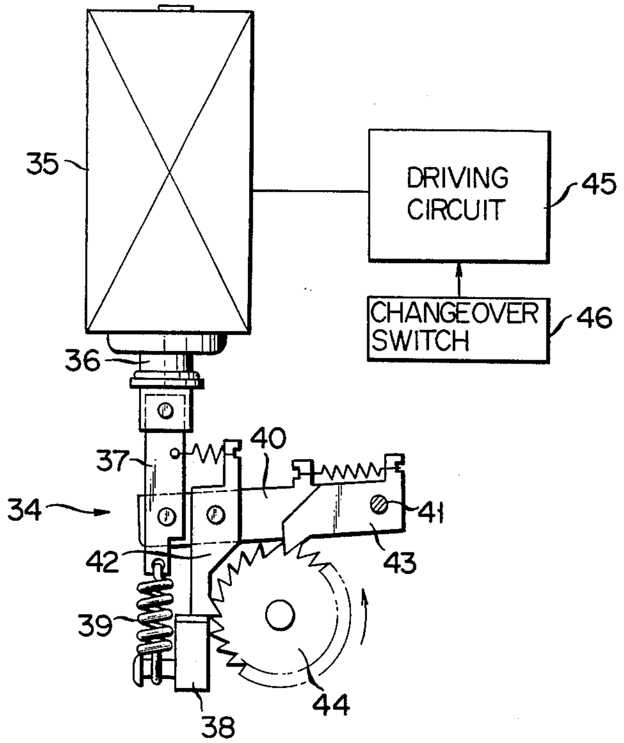
FIG. 4 is an enlarged view of a ratchet and ratchet wheel mechanism as a drive means for feeding the slip blank.

The supply-side wheel 30 is a driving wheel which is intermittently rotated in the arrowed direction of FIG. 2 by a ratchet and ratchet wheel mechanism 34 specifically shown in FIG. 4 and indicated mostly by broken lines in FIG. 2. The mechanism 34 is driven by a plunger-type solenoid 35.

Referring to FIG. 4, a coil spring 39 is stretched between one end of a reciprocating lever 37 fixed to the other end of a plunger 36 of the solenoid and a fixed member 38. One end of a rock lever 40 is pivotally attached to the middle portion of the lever 37, while the other end of the lever 40 is rockably mounted on a rocking shaft 41. A feed ratchet 42 and a retaining ratchet 43, pivotally mounted on the lever 40, are severally spring-urged in a direction to engage a wheel 44. The pivot of the retaining ratchet 43 is with the rocking shaft 41.

The solenoid 35 is connected with a driving circuit 45 including a driving power source, which is coupled with a changeover switch 46. When the solenoid 35 is energized, the feed ratchet 42 rocks the wheel 44 by one pitch in the arrowed direction, while the retaining ratchet 43 prevents the wheel 44 from reversing.

Since the printing pitch is ½ or ⅓ inch, the tooth pitch of the ratchet wheel 44 may, for example, be 1/6 inch, the greatest common multiple of ½ and ⅓ inches, so that the number of teeth of the ratchet wheel may be set at 33. In connection with this, the outer peripheral length of the supply-side sprocket 30 is equal to the space between the two adjacent broken lines 22 of the blank P or the length of a slip of $5\frac{1}{2}$ inch, and the number of projections on the sprocket 30, which may be determined in accordance with the pitch of the engaging holes 29 of $\frac{1}{2}$ inch, is 11.

Accordingly, the blank P may be fed for the length of one slip R by a turn of the sprocket wheel 30. For such turn of the supply-side sprocket wheel 30, the lever 37 is reciprocated to give a turn to the wheel 44 by energizing the solenoid 35. Since the tooth pitch of the wheel 44 is set at 1/6 inch, we obtain a FIG. 3 from calculation $\frac{1}{2} \div 1/6 = 3$, if the printing pitch is $\frac{1}{2}$ inch. Therefore, the blank P can be advanced by one row pitch in the printing frame 25 by energizing the solenoid 35 three times. If the printing pitch is $\frac{1}{3}$ inch, on the other hand, the blank can be advanced by the same length by energizing the solenoid 35 twice, since we obtain a FIG. 2 from $\frac{1}{3} \div 1/6 = 2$.

Switching of the solenoid energizing frequency may be achieved by operating the changeover switch 46. Since the specific arrangements of the driving circuit and the changeover switch may easily be understood by one skilled in the art, they are represented by mere blocks.

Thus, the supply-side wheel 30 is intermittently rotated only in the arrowed direction, and the driving force is transmitted to the delivery-side wheel 31 by means of a timing belt 47.

The transcription mechanism 28 is disposed at a middle position X of a substantially horizontal and rectilinear slip blank path 48 defined between the supply- and delivery-side wheels 30 and 31, while the printing mechanism 27 is disposed at a position Y near the delivery-side wheel 31.

The transcription mechanism 28 is composed of an embossing-printing mechanism including a platen 49 and a roller 50. To the transcription position X extends a path 51 (FIG. 5) to convey an I.D. card K as an identification medium, crossing the blank path 48 substantially at right angles thereto. The card path 51 is so formed as to extend substantially horizontally and rectilinearly from the card inlet 17 to the transcription position X, and a plurality of sets of card driving rollers 52 are arranged between the inlet 17 and the position X. The I.D. card K is transferred to the left of FIG. 5 through the path 51, and returned to the right after transcription.

At the transcription position X, information magnetically recorded in the I.D. card K and the user's specific account information recorded by embossing are transferred onto the transcription frame 26 of the slip blank P. The apparatus of this invention is so designed that the first line **25*a* of the printing frame 25 of the blank as shown in FIG. 3 may come to correspond to the printing position Y of the printing mechanism 27 when the transcription frame 26** is brought in alignment with the transcription position X.

Since the construction of the printing mechanism 27, which includes a platen 53, printing head 54, printing head driving motor 55, and printing head driving screw 56, is not peculiar at all, so it will not be described in detail herein.

On the immediate left of the delivery-side sprocket wheel 31 is a separating plate 57 to separate the upper and lower sheets of the blank P, where the blank P from the delivery-side wheel 31 is separated, and the lower sheet $P_2$ is forced down substantially perpendicularly.

Right under the delivery-side wheel 31 are a fixed edge 58 and a rocking edge 59 constituting the cutting mechanism 23, the lower sheet $P_2$ of the blank being passed between these two edges. The cutter mechanism 23 is so located that the broken line 22 of the blank P may reach a cutting position Z of the cutter mechanism 23 when the transcription frame 26 of the blank P is brought in alignment with the transcription position X. The feed distance between the printing position Y and the cutting position Z is reduced since the diameter of the delivery-side wheel 31 is minimized and that the cutter mechanism 23 is disposed in close vicinity to the wheel 31. Accordingly, as shown in FIG. 3, the length from the position of the line 22, which corresponds to the position Z, to the first line **25*a* of the printing frame 25**, which corresponds to the printing position Y, is greatly reduced as compared with the conventional blank, thereby minimizing unavailing space in the blank.

Below the cutter mechanism 23 are a pair of large-diameter slip drawing rollers 60 whose outer peripheral portions are formed of sponge rubber. A guide plate 61 is in partial sliding contact with the outer peripheral surfaces of the sponge rollers 60. The plate 61 is fixed to the body 20. In the prior art apparatus, a distance L from a drawing-side nipping point between the roller 60 and the guide plate 61 to the cutting position Z has had to be longer than the length of the slip in order not to subject the uncut portion of the blank to tensile force. According to this invention, however, the distance L can be shorter than the length of the slip. This point will be understood from the following description.

Figure 5:
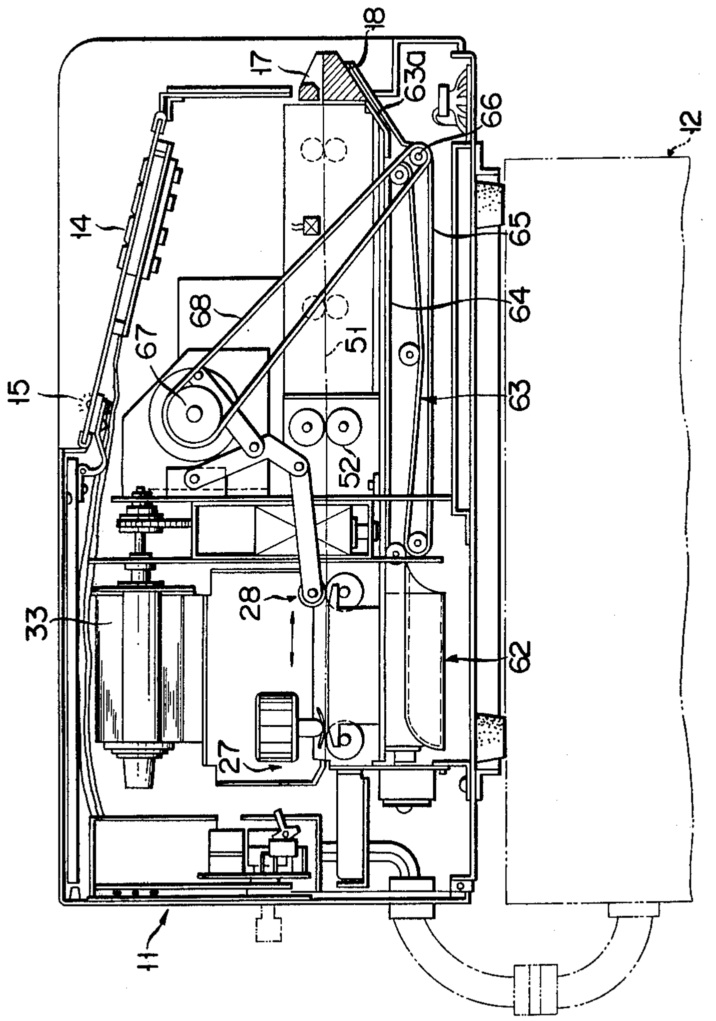
FIG. 5 is a profile of the receipt slip issuing apparatus built in the dispensing machine of FIG. 1, as viewed from a different direction.

There is provided a twist device 62 to change the direction of the movement of the slip on the discharge side of the sponge rolls 60. Each slip R twisted at the device 62 is introduced into a slip delivery path 63 as shown in FIG. 5. The delivery path 63 is composed of a pair of highly elastic drive timing belts 64 and 65 constituting a slip delivery means, and the slip R is conveyed between the belts toward the slip outlet 18 at the right. The delivery path 63 runs in parallel and in the same direction with the horizontal card path 51.

A driving roller 66 for the timing belt 65 is coupled to a driving motor 67 by means of a timing belt 68. By the operation of the motor 67, the upper and lower belts 64 and 65 are driven much faster than the conveyance of the blank.

Figure 8:
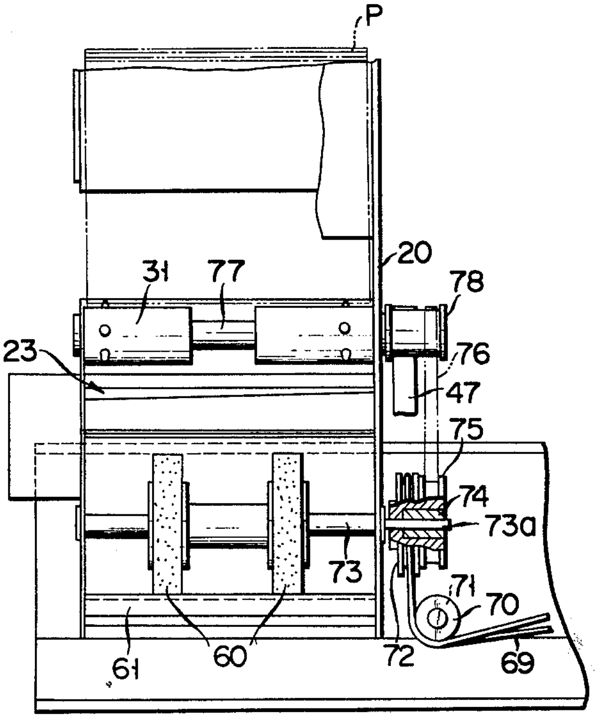
FIG. 8 is a partial sectional view specifically showing a driving mechanism for sponge rollers.
Figure 7:
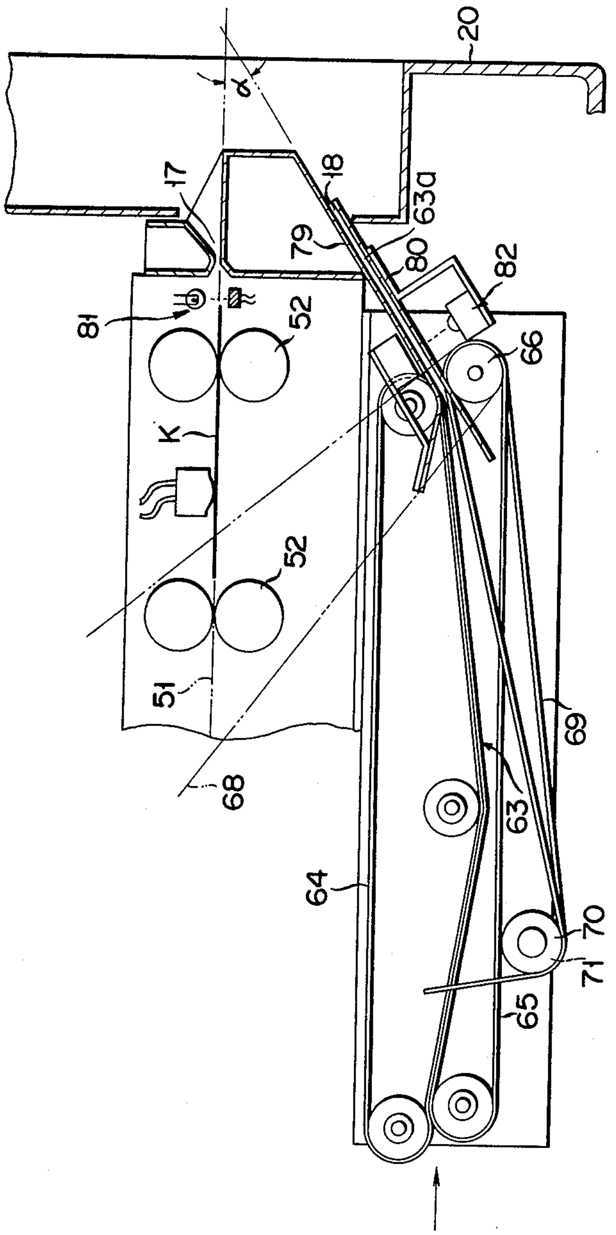
FIG. 7 is a partial sectional view of the receipt slip issuing apparatus as shown in FIG. 5, specially showing the I.D. card inlet-outlet and a slip delivery mechanism section which are somewhat modified as compared with the arrangement of FIG. 5.

AS shown in FIG. 7, a endless belt 69 is stretched over the driving roller 66. The belt 69 is also strected over a pulley 72 through a pair of guide pulleys 70 and 71 as shown in FIG. 8. The pulley 72 is coupled to an extended end portion **73*a* of a rotating shaft 73 of the sponge rollers 60 by means of a unidirectional rotary clutch 74**.

The rotating shaft 73 of the sponge rollers 60 is rotatably mounted on the body frame 20, and the extended end portion **73*a* thereof is coupled with a pulley 75, as well as the pulley 72, again by means of the unidirectional rotary clutch 74. An endless belt 76 is stretched over both pulleys 75 and 78. The belt 76 is mounted on an extended portion of a shaft 77** of the delivery-side sprocket wheel.

Thus, the rotating shaft 73 of the sponge rollers 60 is given turning effort from two directions. That is, the shaft 73 is rotated along with the driving roller 66 for slip delivery at high speed by means of the belt 69, and also intermittently driven together with the delivery-side wheel 31 at low speed by means of the belt 76. As the timing for the drive, transcribing and printing operations are performed, and a one-unit blank (lower sheet) comes out from the delivery-side wheel 31 and goes down. Then, the bottom end of the blank penetrates between the sponge rollers 60 and the guide plate 61 before a portion to be cut reaches the cutter mechanism 23. At this point of time, however, the driving roller 66 for slip delivery is stopped, so that the shaft 73 of the sponge rollers 60 is not supplied with the high-speed power, but with the low-speed power alone.

Accordingly, the uncut blank $P_2$ will never be subjected to excessive tensile force from the sponge rollers 60. Moreover, the hold of the blank between the sponge rollers 60 and the guide plate 61 is resilient, applying no excessive tension to the blank. Thus, the distance L may be much shorter than the slip length.

When the one-unit blank is further lowered and the broken line on the blank reaches the cutting position Z, the slip R is cut off. Then, the slip delivery driving roller 66 starts to rotate to turn the pulley 72 at high speed, and the receipt slip is conveyed at high speed.

As shown in FIGS. 5 and 7, a portion 63*a* of the slip delivery path near the slip outlet 18 is inclined upward. Although the peripheral arrangement including the slip outlet 18 and the card inlet 18 of FIG. 7 is a somewhat modified version of that of FIG. 5, the intention of this invention is shared by both these arrangements.

Referring now to FIG. 7, the extended axis of the inclined delivery path portion 63*a* defined by a pair of guide brackets 79 and 80 is so designed as to cross the extended axis of the horizontal card path 51 communicating with the card inlet 17 at an angle of $\alpha$. The angle $\alpha$ may be set at 35°, for example.

Figure 6:
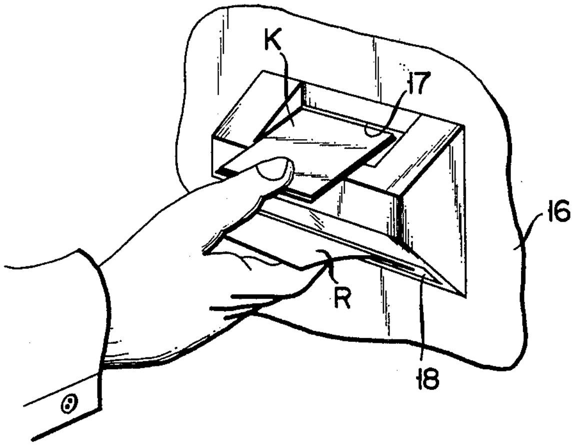
FIG. 6 shows how a user draws one-handed an I.D. card and a receipt slip respectively out of an I.D. card inlet-outlet and a slip outlet of the dispensing machine of FIG. 1.

Accordingly, the I.D. card K and the receipt slip R are returned and delivered respectively in the directions of these extended axes, overlapping each other at the intersecting point of the axes. Thus, as shown in FIG. 6, the user can easily catch and receive both the card K and the receipt slip R one-handed.

Such close positional relationship between the card inlet 17 and the slip outlet 18 may be inverted in design, that is, the slip outlet 18 may be disposed above the card inlet 17.

Although the card inlet 18 doubles as a card outlet, it is named simply as "inlet" in this embodiment for the ease of description. Further, optical detectors 81 and 82 each formed of a combination of a lamp and a photo cell are disposed in the paths 51 and 63*a* inside the inlet 17 and the outlet 18, respectively. These detectors detect the passage or existence of the card and slip, and supply the detection results to the control section of the apparatus as control signals for the apparatus operations.

According to the receipt slip issuing apparatus of this invention, as described above, the transcription, printing, and cutting mechanisms can be arranged just in accordance with the one-unit slip length, so that the feed of the slip blank need be performed only in one direction, requireing no complicated feed control. Thus, the cost of the apparatus can be reduced. Moreover, the overall dimensions of the apparatus can also be reduced, conducing the miniaturization of the cash dispensing machine containing such apparatus.

Furthermore, the miniaturization of the apparatus facilitates the arrangement of the card inlet and the slip outlet in close vicinity to each other, thereby simplifying the user's operations.

What is claimed is:

1. A receipt slip issuing apparatus, comprising:

a body;

an identification medium inlet in said body;

a blank storage chamber disposed in said body to contain a receipt slip blank or paper formed of at least two-ply sheets and including longitudinally continuous receipt slips;

blank feed means drawing said blank out of said storage chamber and feeding said blank only in one direction through a blank path defined inside said body;

a medium path defined inside said body, having one end connected to said inlet, and crossing said blank path;

medium feed means carrying through said medium path an identification medium inserted through said inlet;

transcription means disposed in said blank path at a position to cross said medium path and transferring specific account information recorded in said identification medium to said receipt slip blank;

printing means disposed in said blank path at a distance from said transcription means, whereby transient account information provided by said apparatus is printed on said receipt slip blank, said printing means being so located as to correspond to a first line on one slip of said blank to be printed when said blank is in a position for the transcription by said transcription means;

cutter means for cutting at least one sheet of said receipt slip blank for each slip, said cutter means being so located as to correspond to a position to cut said at least one sheet for each slip when said blank is in said position for the transcription by said transcription means;

a slip outlet in said body; and slip delivery means for carrying the receipt slip out by said cutter means to said slip outlet through a slip delivery path defined inside said body.

2. A receipt slip issuing apparatus according to claim 1, wherein the identification medium is conveyed by said medium feed means both in one direction from said medium inlet and in an opposite direction toward said medium inlet, and said medium path inside said body is substantially horizontal and rectilinear.

3. A receipt slip issuing apparatus according to claim 1, wherein said slip outlet is located above or below said identification medium inlet in close vicinity thereto, thereby enabling a user to catch and draw out one-handed at a time both said medium and said slip exposed from said in—and outlets.

4. A receipt slip issuing apparatus according to claim 3, wherein a portion of said medium path connected to said identification medium inlet is substantially horizontal, and a portion of said slip delivery path connected to said slip outlet is inclined so that the extension of said portion of the slip delivery path may cross the extension of said portion of the medium path at a certain angle outside said apparatus.

5. A receipt slip issuing apparatus according to claim 2, wherein said slip blank path cuts said medium path substantially at right angles.

6. A receipt slip issuing apparatus according to claim 1, wherein said details slip blank feed means includes supply—and delivery-side sprocket wheels, a driving solenoid, and a ratchet and ratchet wheel mechanism disposed between said solenoid and said supply-side sprocket wheel, whereby said wheel is driven intermittently in one direction.

7. A receipt slip issuing apparatus according to claim 6, wherein the diameter of said delivery-side sprocket wheel is smaller than that of said supply-side sprocket wheel.

8. A receipt slip issuing apparatus according to claim 6, wherein said blank path between said supply—and delivery-side sprocket wheels is substantially horizontal.

9. A receipt slip issuing apparatus according to claim 6, wherein said cutter means is located below said delivery-side sprocket wheel.

10. A receipt slip issuing apparatus according to claim 1, wherein a rotating slip drawing roller with at least outer peripheral portion formed of sponge rubber and a guide plate in sliding contact with the outer peripheral surface of said roller are arranged in said slip delivery path, a receipt slip being conveyed held between the outer peripheral surface of said roller and said guide plate.

11. A receipt slip issuing apparatus according to claim 10, wherein the distance between a blank cutting position at said cutter means and a slip drawing position at said slip drawing roller is shorter than the length of each slip of said receipt slip blank.

* * * * *